(12) United States Patent
Kobayashi

(10) Patent No.: US 8,553,277 B1
(45) Date of Patent: Oct. 8, 2013

(54) IMAGE FORMING SYSTEM HAVING AN IMAGE CHECKING APPARATUS AND NON-TRANSITORY COMPUTER-READABLE MEDIUM

(71) Applicant: Fuji Xerox Co., Ltd., Tokyo (JP)

(72) Inventor: Kazuhide Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/766,105

(22) Filed: Feb. 13, 2013

(51) Int. Cl.
  *G06K 15/10* (2006.01)
(52) U.S. Cl.
  USPC .......... 358/1.5; 358/1.12; 358/1.18; 399/394; 399/395; 399/396; 399/388; 271/3.13; 271/3.14; 271/3.15; 271/3.17; 271/10.02
(58) Field of Classification Search
  USPC ............... 358/1.5, 1.12, 1.18; 399/394, 395, 399/396, 388; 271/3.13, 3.14, 3.17, 3.15, 271/10.03
  See application file for complete search history.

(56) References Cited

U.S. PATENT DOCUMENTS

| | | | |
|---|---|---|---|
| 2012/0070160 A1* | 3/2012 | Aoki | 399/16 |
| 2012/0081715 A1* | 4/2012 | Takano | 358/1.5 |

FOREIGN PATENT DOCUMENTS

| | | | |
|---|---|---|---|
| JP | 3-052452 A | | 3/1991 |
| JP | 6-347219 A | | 12/1994 |
| JP | 2000-097678 A | | 4/2000 |
| JP | 2006-217374 A | | 8/2006 |
| JP | 2007-060516 A | | 3/2007 |
| JP | 2007060516 A | * | 3/2007 |

OTHER PUBLICATIONS

Office Action dated Jun. 28, 2012, in Japanese Patent Application No. 2012-063384.

* cited by examiner

*Primary Examiner* — Jacky X Zheng
(74) *Attorney, Agent, or Firm* — Sughrue Mion, PLLC

(57) ABSTRACT

An image forming apparatus including an image forming apparatus and an image checking apparatus. The image forming apparatus includes a transport control unit which transports a recording medium at a transport speed, and forms an image on the recording medium. The image checking apparatus includes a transport-speed acquisition unit, a detector, a reading unit, and an operation-state notification unit. The transport-speed acquisition unit acquires transport-speed information from the image forming apparatus. The detector detects a mark shown on the recording medium. The reading unit reads a checking-target image formed by the image forming apparatus at a position distant from the mark, on the basis of the transport-speed information and information concerning a positional relationship between the mark and the checking-target image. The operation-state notification unit notifies the image forming apparatus of an operation state of the image checking apparatus.

18 Claims, 6 Drawing Sheets

IMAGE FORMING SYSTEM HAVING AN IMAGE CHECKING APPARATUS AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-063384 filed Mar. 21, 2012.

BACKGROUND

Technical Field

The present invention relates to an image forming system and a non-transitory computer-readable medium.

SUMMARY

According to an aspect of the invention, there is provided an image forming apparatus including an image forming apparatus and an image checking apparatus. The image forming apparatus includes a transport control unit which transports a recording medium at a set transport speed, and forms an image on the recording medium. The image checking apparatus includes a transport-speed acquisition unit, a detector, a reading unit, and an operation-state notification unit. The transport-speed acquisition unit acquires transport-speed information concerning a transport speed from the image forming apparatus. The transport-speed information is used as control information of the image forming apparatus. The detector detects a mark shown on the recording medium which is being transported. The reading unit reads a checking-target image on the basis of the transport-speed information and information concerning a positional relationship between the mark and the checking-target image. The checking-target image is formed by the image forming apparatus at a position distant from the mark detected by the detector. The operation-state notification unit notifies the image forming apparatus of an operation state of the image checking apparatus. In a case where the image forming apparatus has received, from the operation-state notification unit, a notification indicating that the image checking apparatus is in a state of performing checking, the image forming apparatus prohibits the set transport speed from being changed. In a case where the image forming apparatus has received, from the operation-state notification unit, a notification indicating that the image checking apparatus is in a state of having finished checking, the image forming apparatus cancels the prohibition of changing the set transport speed and stops transport of the recording medium.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described with reference to the drawings. Note that, although an exemplary embodiment of the present invention is described below using continuous paper as an example of a recording medium, the recording medium is not limited to continuous paper, and an exemplary embodiment of the present invention may be described using cut paper as an example of the recording medium.

Figure 1:
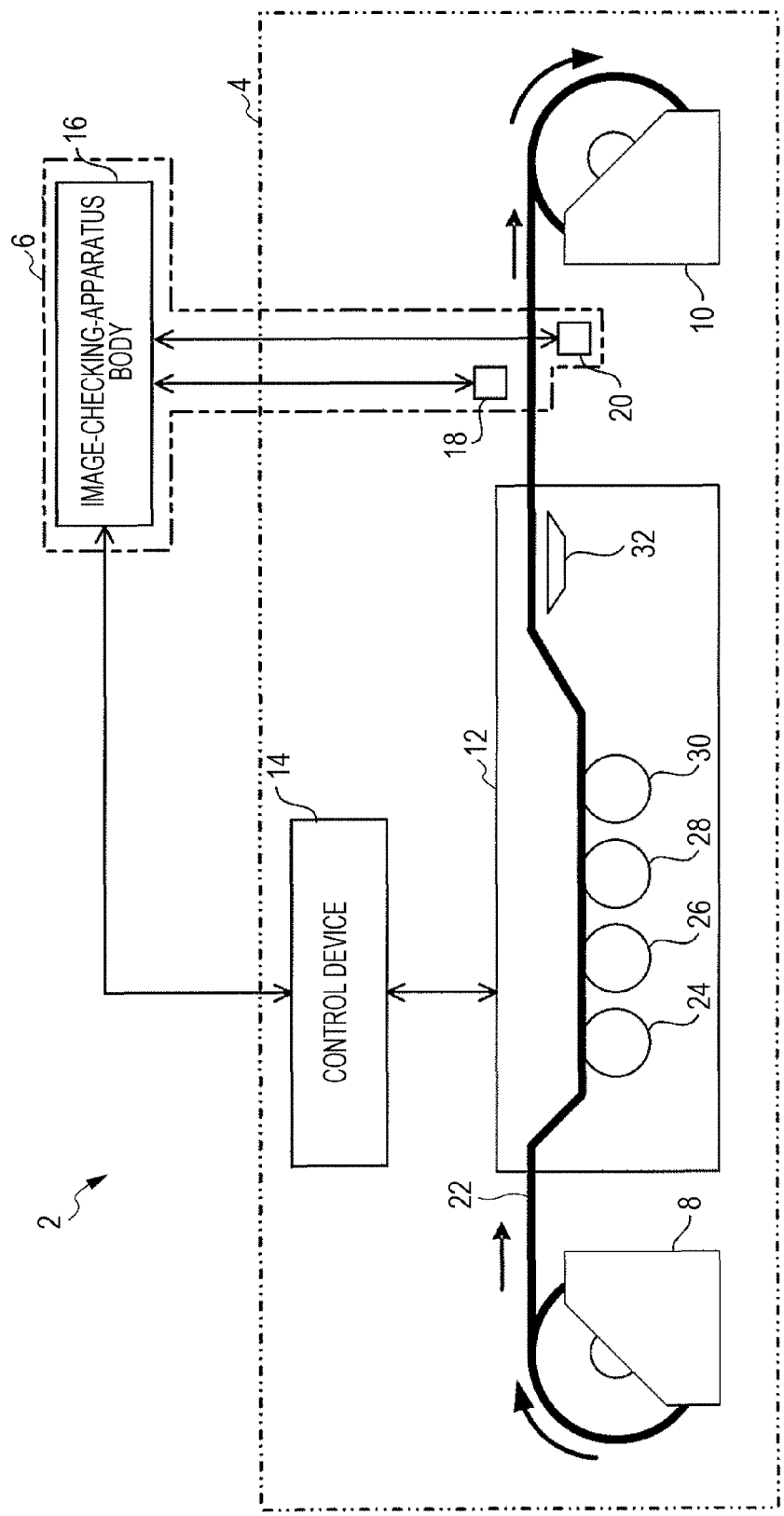
FIG. 1 is a schematic diagram illustrating an example of a configuration of an image forming system according to an exemplary embodiment of the present invention.

FIG. 1 is a schematic diagram illustrating an example of a configuration of an image forming system 2 according to an exemplary embodiment of the present invention. The image forming system 2 includes an image forming apparatus 4 and an image checking apparatus 6.

As illustrated in FIG. 1, the image forming apparatus 4 includes, for example, a paper feeding device 8, a stack (storage) device 10, a printing device 12, and a control device 14. The image checking apparatus 6 includes an image-checking-apparatus body 16, a detection sensor 18, and an image capture camera 20.

First, the image forming apparatus 4 will be described.

The paper feeding device 8 supplies continuous paper 22, such as roll paper, as a recording medium to the printing device 12. The stack device 10, for example, rolls up the continuous paper 22 that has been printed by the printing device 12, thereby storing the continuous paper 22.

The printing device 12 includes photoconductor drums 24 to 30 and a fixing unit 32. The photoconductor drums 24 to 30 hold toner images of individual colors, e.g., Y (yellow), M (magenta), C (cyan), and K (black). The printing device 12 performs printing on the continuous paper 22, which is a recording medium, under control performed by the control device 14 described below.

For example, when the control device 14 accepts, from an external apparatus (for example, a computer) that is not illustrated, via a network or the like, a print job for forming images on multiple pages, the printing device 12 irradiates the individual photoconductor drums 24 to 30 with laser light under control performed by the control device 14, thereby forming individual electrostatic latent images on the photoconductor drums 24 to 30. Then, the electrostatic latent images formed on the photoconductor drums 24 to 30 are developed by developing devices (not illustrated) using toners of the individual colors to obtain four types of toner images, and the four types of toner images are transferred onto the continuous paper 22 so as to be superimposed on each other. Then, the toner images transferred onto multiple pages of the continuous paper 22 are fixed on the continuous paper 22 by the fixing unit 32.

The control device 14 has, for example, similarly to the image checking apparatus 6 described below, a configuration of a computer that is configured by connecting a central processing unit (CPU), a memory, a storage device such as a hard disk drive (HDD), and a communication interface (IF), which performs transmission/reception of data, with each other via a control bus. Furthermore, a user interface (UI) device is also connected to the control bus.

In the control device 14, the CPU performs processes based on a program that is stored in the memory or the storage device, thereby controlling the individual units constituting the image forming apparatus 4. Note that, instead of being supplied from the memory or the storage device, the program may be stored on a recording medium such as a compact disc read-only memory (CD-ROM), and supplied. This recording medium may be a magnetic disk, a semiconductor memory, or another recording medium. Moreover, the program may be supplied via the above-mentioned communication I/F.

The control device 14 transmits/receives data to/from an external apparatus that transmits a print job and that is not illustrated, the image checking apparatus described below, and so forth via the above-mentioned communication I/F. For example, the control device 14 receives a print job that has been transmitted by an external apparatus and that is written in page description language (PDL) or the like via the communication I/F. The control device 14 performs control so that individual electrostatic latent images will be formed on the photoconductor drums 24 to 30 for images of the individual colors, which are Y, M, C, and K, for each page. Note that the printing device 12 may be a duplex color printing apparatus which forms individual four types of toner images on each side of the continuous paper 22 so that the toner images will be superimposed on each other.

Furthermore, the control device 14 controls a transport mechanism, which is not illustrated, of the image forming apparatus 4 so that the continuous paper 22 will be transported at a predetermined transport speed.

Figure 2:
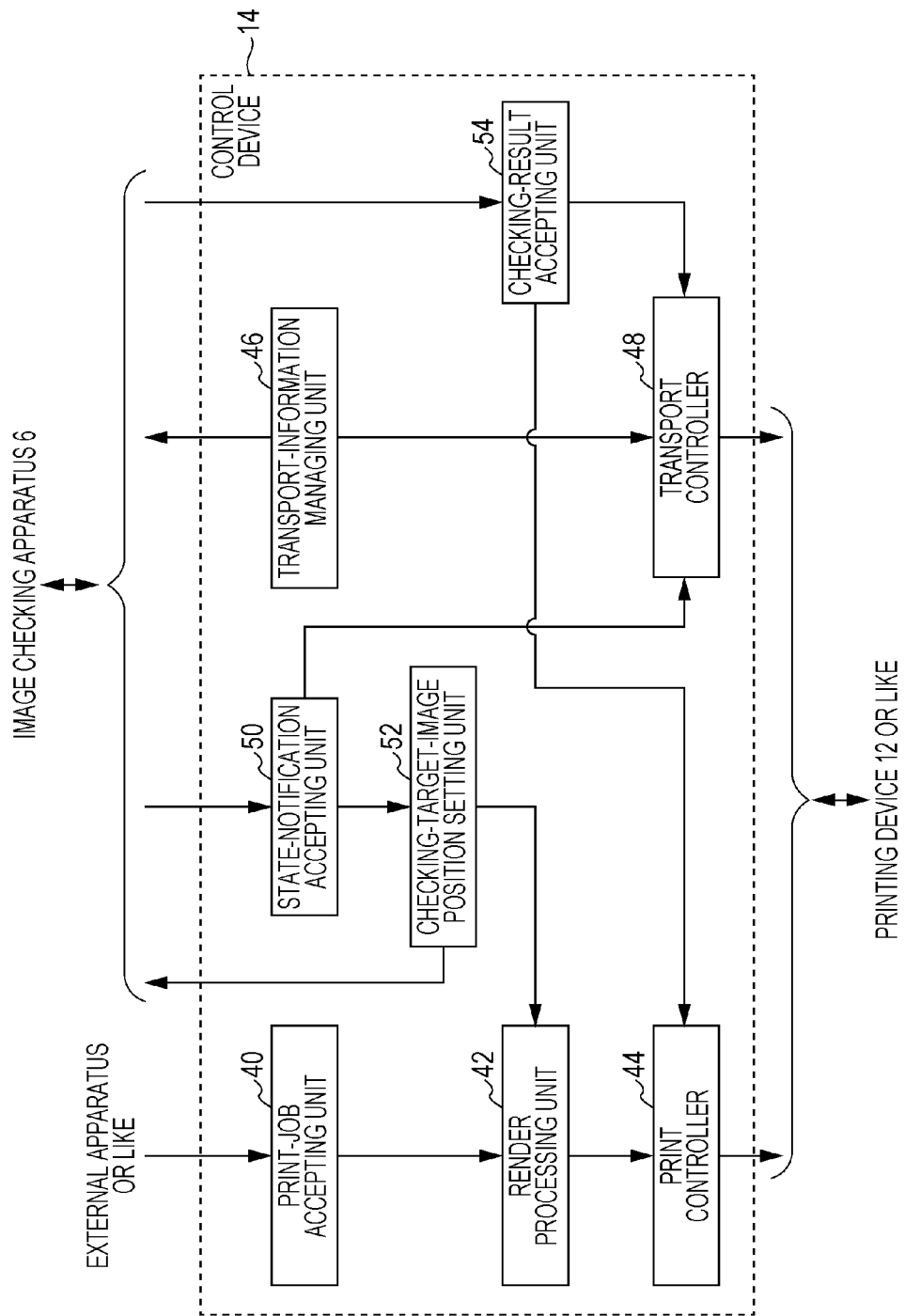
FIG. 2 is a block diagram illustrating a functional configuration of a control device that is realized by executing a program.

FIG. 2 is a block diagram illustrating a functional configuration of the control device 14 that is realized by executing the above-mentioned program.

As illustrated in FIG. 2, the control device 14 includes a print-job accepting unit 40, a render processing unit 42, a print controller 44, a transport-information managing unit 46, a transport controller 48, a state-notification accepting unit 50, a checking-target-image position setting unit 52, and a checking-result accepting unit 54.

The print-job accepting unit 40 accepts, via the above-mentioned communication IF, a print job that has been received from, for example, an external apparatus. The print-job accepting unit 40 in the present exemplary embodiment receives PDL data.

The render processing unit 42 functions as a raster image processor (RIP) that renders images (bitmap data) for pages on the basis of the PDL data accepted by the print-job accepting unit 40.

Here, in the case of rendering images for pages, the render processing unit 42 renders a checking-target image at a position that is set by the checking-target-image position setting unit 52 described below in each of the pages. Note that the checking-target image is an image that is to be used in checking performed by the image checking apparatus 6. The checking-target image may be a portion or entirety of an image that is to be rendered on the basis of the PDL data accepted by the print-job accepting unit 40 or may be an image that is not included in the PDL data accepted by the print-job accepting unit 40. In the case of rendering an image that is not included in the PDL data accepted by the print-job accepting unit 40 as the checking-target image, the render processing unit 42 adds the checking-target image to an image that is to be rendered on the basis of the PDL data, thereby obtaining an image for each of the pages, and renders the image for each of the pages. As an example of the checking-target image to be added, for example, an image representing a page number of a page including an image that is to be rendered on the basis of a print job is used.

The print controller 44 performs control so that the bitmap data processed by the render processing unit 42 will be printed. Note that the print controller 44 may perform control so that a print position will be adjusted on the basis of the position of a registration mark shown on the continuous paper 22. In this case, for example, the print controller 44 detects a registration mark using a sensor, which is not illustrated, to obtain detection information, and performs control so that a print position will be adjusted on the basis of the detection information.

Furthermore, in the case where the print controller 44 has received an instruction to stop a process from the checking-result accepting unit 54 described below, the print controller 44 performs control so as to stop a print process.

The transport-information managing unit 46 manages transport-speed information concerning a transport speed of the continuous paper 22. The transport-speed information may be information concerning a transport speed measured by a measurement device that is not illustrated and that is used for a transport speed, or may be a set value of the transport speed. The transport-speed information managed by the transport-information managing unit 46 is used for control of the image forming apparatus 4. In the present exemplary embodiment, the transport-speed information is used for control, which is performed by the transport controller 48, of the transport mechanism. Note that, as the configuration of the measurement device used for a transport speed, for example, a configuration is used, in which the number of rotations of a main motor that drives the transport mechanism or the number of rotations of a roller that transports the recording medium is measured by a rotary encoder or the like.

The transport controller 48 controls the transport mechanism, which transports the recording medium in the image forming apparatus 4 and which is not illustrated, on the basis of the transport-speed information managed by the transport-information managing unit 46. For example, the transport controller 48 controls the transport mechanism so that the continuous paper 22 will be transported at a set value of the transport speed indicated by the transport-speed information. Additionally, for example, the transport controller 48 compares an actual transport speed that has been measured by the measurement device used for a transport speed with the set value of the transport speed, and further performs control of the transport mechanism on the basis of a result of comparison.

Moreover, in the case where the transport controller 48 has been notified, from the state-notification accepting unit 50, of information indicating that the image checking apparatus 6 is in a state of performing checking, the transport controller 48 performs control so as to maintain the current transport speed of the transport mechanism. The transport controller 48 may perform control so as to maintain the current transport speed of the transport mechanism until the transport controller 48 is notified, from the state-notification accepting unit 50, of information indicating that the image checking apparatus 6 is in a state of having finished checking.

Furthermore, in the case where the transport controller 48 has received an instruction to stop a process from the checking-result accepting unit 54 described below, the transport controller 48 performs control so as to stop transport of the continuous paper 22.

The state-notification accepting unit 50 accepts information concerning an operation state of the image checking apparatus 6. Examples of the operation state of the image checking apparatus 6 that is to be accepted by the state-notification accepting unit 50 include the state of performing checking or the state of having finished checking. The state-notification accepting unit 50 notifies the checking-target-image position setting unit 52 and the transport controller 48 of the accepted information.

The checking-target-image position setting unit 52 sets the print position of the checking-target image. The checking-target-image position setting unit 52 notifies the render processing unit 42 and the image checking apparatus 6 of the set print position.

The checking-target-image position setting unit 52 sets the print position of the checking-target image. Note that, in the case where an image that is to be rendered on the basis of the PDL data accepted by the print-job accepting unit 40 is used as the checking-target image, the checking-target-image position setting unit 52 sets the position of a region that is included in the image and that is to be used as the checking-target image. The checking-target-image position setting unit 52 notifies the render processing unit 42 of the set print position.

Moreover, when the print position of the checking-target image is set, the positional relationship between a mark, which is described below, and the checking-target image is determined on the basis of the print position. The checking-target-image position setting unit 52 notifies the render processing unit 42 and the image checking apparatus 6 of information indicating the positional relationship between the mark and the checking-target image.

Note that, in the case where the checking-target-image position setting unit 52 has been notified, from the state-notification accepting unit 50, of information indicating that the image checking apparatus 6 is in the state of performing checking, the checking-target-image position setting unit 52 performs control so that the print position will not be changed or set to another position, the set print position will be maintained, and the positional relationship between the mark and the checking-target image will be maintained.

The checking-result accepting unit 54 accepts information concerning a result of checking performed by the image checking apparatus 6. In the case where the checking-result accepting unit 54 in the present exemplary embodiment accepts information concerning a checking result indicating abnormality, the checking-result accepting unit 54 instructs the print controller 44 and the transport controller 48 to stop processes.

Figure 3:
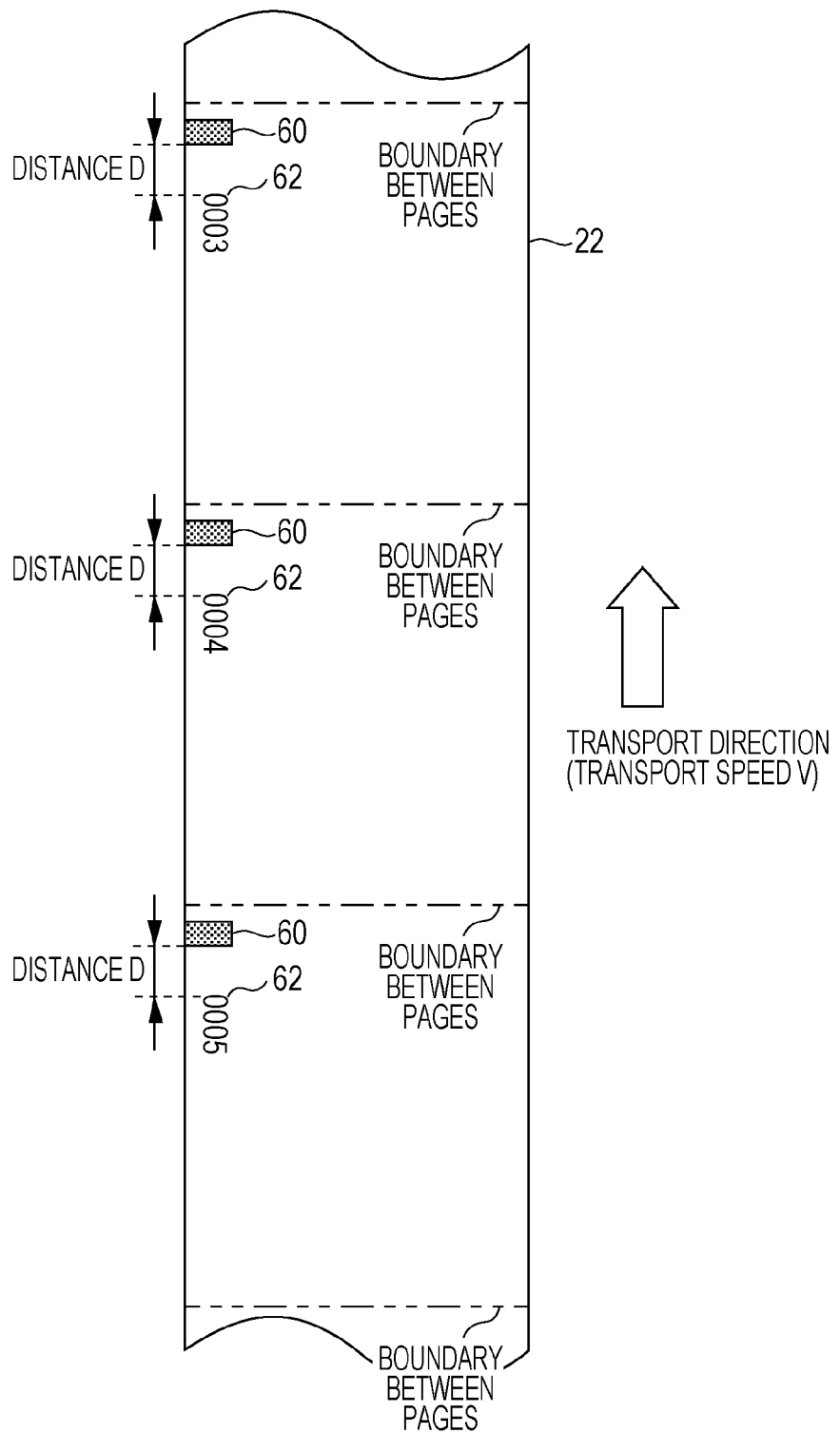
FIG. 3 is a schematic diagram illustrating an example of continuous paper printed by a printing device.

FIG. 3 is a schematic diagram illustrating an example of the continuous paper 22 printed by the printing device 12. In the example illustrated in FIG. 3, on each page, a mark 60 and a checking-target image 62 are shown. The checking-target image 62 is printed at a position that is located upstream from the mark 60 in a transport direction and that is a distance D distant from the mark 60. However, the mark 60 may be shown on the continuous paper 22 in advance, or printed when the checking-target image 62 is printed. Furthermore, the mark 60 and the checking-target image 62 are individually printed on different sides of the continuous paper 22. Note that, in the case where the checking-target image 62 is not the entirety of an image that is to be rendered on the basis of the PDL data, in addition to the mark 60 and the checking-target image 62, the image that has been rendered on the basis of the PDL data accepted by the print-job accepting unit 40 is printed on either side of the continuous paper 22.

In the example illustrated in FIG. 3, the mark 60 is a registration mark that is used for registration of a print position in each page in the case of printing with the printing device 12. However, the mark 60 is not limited thereto. The mark 60 may be a mark shown on each page of the continuous paper 22.

Furthermore, in the example illustrated in FIG. 3, the checking-target image 62 is an image representing a page number of a page including a printed image. However, the checking-target image 62 may be an image that is printed at a position which is located upstream from the mark 60 in the transport direction and which is a predetermined distance (the distance D in the example illustrated in FIG. 3) distant from the mark 60.

Next, the image checking apparatus 6 will be described.

As described in FIG. 1, the image checking apparatus 6 in the present exemplary embodiment includes the image-checking-apparatus body 16, the detection sensor 18, and the image capture camera 20.

The detection sensor 18 is provided at any position downstream from the photoconductor drums 24 to 30 of the printing device 12 in the transport direction of the continuous paper 22, and may be provided at any position downstream from the fixing unit 32 in the transport direction of the continuous paper 22. The detection sensor 18 detects the mark. The detection sensor 18 is, for example, an optical sensor, and irradiates the continuous paper 22 with light and receives light reflected from the mark using a light receiving element, thereby detecting the mark.

The image capture camera 20 is configured to capture an image under control performed by a reading controller 96 described below. Furthermore, the image capture camera 20 is provided at a certain position so as to be, when or after the detection sensor 18 has detected the mark, capable of capturing an image of the checking-target image which is the predetermined distance (the distance D in the example illustrated in FIG. 3) distant from the mark. Note that the image capture camera 20 is provided so as to perform image capture for a side that has been printed by the printing device 12. Moreover, the image capture camera 20 captures an image of the checking-target image under control performed by the reading controller 96.

Figure 4:
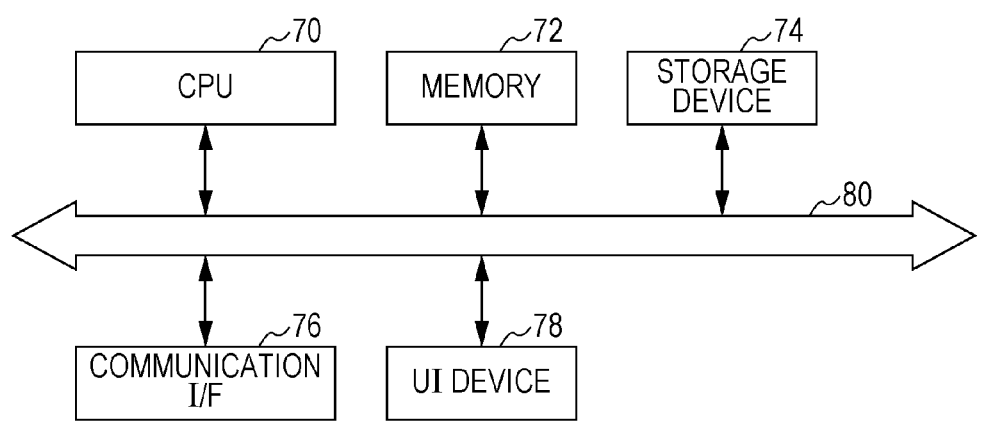
FIG. 4 is a schematic diagram illustrating a hardware configuration of an image-checking-apparatus body.

FIG. 4 is a schematic diagram illustrating a hardware configuration of the image-checking-apparatus body 16. As illustrated in FIG. 4, the image-checking-apparatus body 16 has a configuration of a computer that is configured by connecting a CPU 70, a memory 72, a storage device 74 such as an HDD, a communication I/F 76, which performs transmission/reception of data, and a UI device 78 with each other via a control bus 80.

The CPU 70 performs processes based on a program that is stored in the memory 72 or the storage device 74, thereby controlling an operation of the image checking apparatus 6. Note that, instead of being supplied from the memory 72 or the storage device 74, the program may be stored on a recording medium such as a CD-ROM, and supplied. This recording medium may be a magnetic disk, a semiconductor memory, or another recording medium. Moreover, the program may be supplied via the above-mentioned communication I/F 76.

Figure 5:
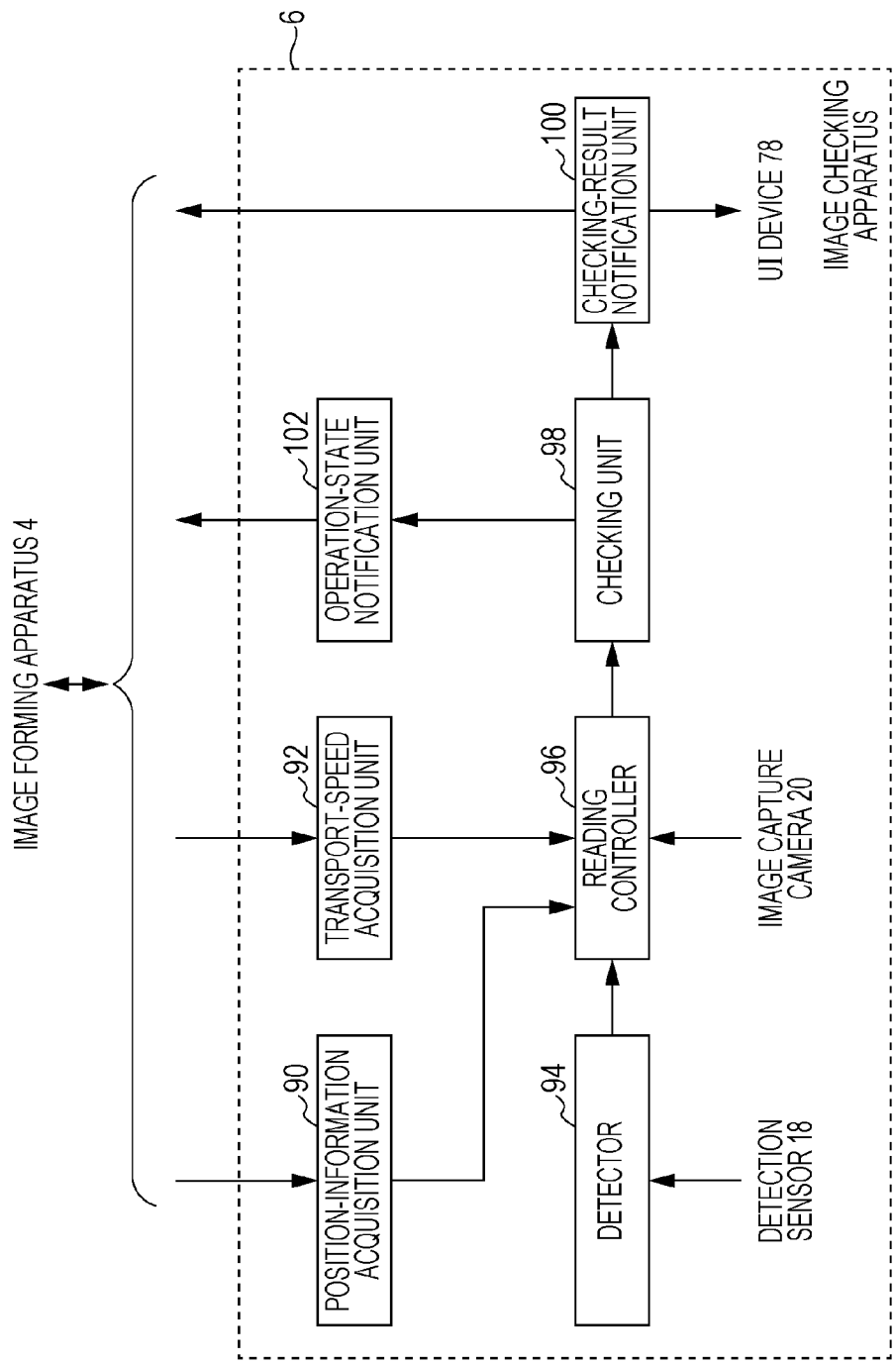
FIG. 5 is a block diagram illustrating a functional configuration of an image checking apparatus that is realized by executing a program.

FIG. 5 is a block diagram illustrating a functional configuration of the image checking apparatus 6 that is realized by executing the program with the CPU 70.

As illustrated in FIG. 5, the image checking apparatus 6 includes a position-information acquisition unit 90, a transport-speed acquisition unit 92, a detector 94, the reading controller 96, a checking unit 98, a checking-result notification unit 100, and an operation-state notification unit 102.

The position-information acquisition unit 90 receives and acquires information concerning the print position of the checking-target image from the image forming apparatus 4. More specifically, the position-information acquisition unit 90 acquires, from the checking-target-image position setting unit 52 of the image forming apparatus 4, information (hereinafter, referred to as position information) concerning the positional relationship between the mark and the checking-target image. In the example illustrated in FIG. 3, the position-information acquisition unit 90 acquires, as the position information, information indicating that the print position of the checking-target image 62 is a position which is located upstream of the mark 60 in the transport direction and which is the distance D distant from the mark 60. Accordingly, even when the position information has been changed on the image forming apparatus 4 side, control of the reading controller 96 described below is performed on the basis of the position information that has been changed.

The transport-speed acquisition unit 92 receives and acquires, from the image forming apparatus 4, information (hereinafter, referred to as transport-speed information), which is used as control information of the image forming apparatus 4, concerning the transport speed of the continuous paper 22. Accordingly, even when the transport speed has been changed on the image forming apparatus 4 side, control of the reading controller 96 described below is performed on the basis of the transport-speed information that has been changed.

As described above, the transport-speed acquisition unit 92 acquires the transport-speed information by receiving information that is used as control information of the image forming apparatus 4, instead of by providing a measurement device, which is used for a transport speed, in the transport mechanism or the like of the image checking apparatus 6 and by acquiring the transport-speed information. Thus, no measurement device needs to be provided.

Moreover, for example, in order to acquire the transport speed, in the case where a measurement device such as a rotary encoder is provided so as to be in contact with an axis that is used to transport the continuous paper 22 or in contact with the continuous paper 22, an issue such as a reduction in the transport performance or stains on the continuous paper 22 may occur because the measurement device is provided. However, in the case where the transport-speed acquisition unit 92 acquires the transport-speed information, because no measurement device is provided, occurrence of such an issue is reduced.

The detector 94 receives a signal from the detection sensor 18, thereby detecting whether or not the mark has passed a position at which the detection sensor 18 is provided. Furthermore, when the detector 94 has detected that the mark has passed the position, the detector 94 outputs, to the reading controller 96, information indicating that the mark has passed the position.

The reading controller 96 determines image capture timing, at which image capture is to be performed by the image capture camera 20, on the basis of the position information, which has been acquired by the position-information acquisition unit 90, concerning the positional relationship between the mark and the checking-target image, and the transport-speed information, which has been acquired by the transport-speed acquisition unit 92. The reading controller 96 controls the image capture camera 20 so that an image of the checking-target image 62 will be captured by the image capture camera 20. Note that the image capture timing is a time period from when the detector 94 detects the mark to when image capture is performed by the image capture camera 20.

In the case where a detection position at which the detection sensor 18 detects the mark and an image capture position at which image capture is performed by the image capture camera 20 are the same, in the example illustrated in FIG. 3, for example, the reading controller 96 determines a time period D/V as the image capture timing on the basis of the distance D that is indicated by the position information acquired by the position-information acquisition unit 90 and a transport speed V that is indicated by the transport-speed information acquired by the transport-speed acquisition unit 92. The reading controller 96 performs control so that image capture will be performed for the continuous paper 22 by the image capture camera 20 after the time period D/V has elapsed since the detector 94 detected that the mark had passed the position at which the detection sensor 18 is provided.

Here, even when the positional relationship between the mark and the checking-target image has been changed in the image forming apparatus 4, the reading controller 96 acquires position information concerning the positional relationship that has been changed from the position-information acquisition unit 90, thereby dealing with the change in the positional relationship.

Note that, in the present exemplary embodiment, the position information concerning the positional relationship is received and acquired by the position-information acquisition unit 90 from the image forming apparatus 4. However, the reading controller 96 may determine the image capture timing on the basis of position information input by the UI device 78 or position information that is stored in the storage device 74 in advance.

Additionally, the reading controller 96 outputs, to the checking unit 98, an image that has been captured by the image capture camera 20 at the determined image capture timing.

The checking unit 98 performs checking based on the image output by the reading controller 96. Note that, checking performed by the checking unit 98 may be checking based on the checking-target image whose image has been captured by the image capture camera 20. In the example illustrated in FIG. 3, for example, the checking unit 98 checks whether or not the page number shown as the checking-target image on each page continuously changes in accordance with the order of pages. In this case, for example, in the case where a page number is missing, the checking unit 98 determines that predetermined printing has not been performed by the image forming apparatus 4.

Note that, for example, the checking unit 98 may consider, as the checking-target image, a rendered image that has been rendered using the PDL data accepted by the print-job accepting unit 40 of the image forming apparatus 4. The checking unit 98 may compare the image captured by the image capture camera 20 with the rendered image, and may check whether stains caused by printing are present on the continuous paper 22 or whether any of the contents that should have been printed are missing.

Moreover, the checking unit 98 outputs, to the checking-result notification unit 100, a result of checking based on the checking-target image whose image has been captured by the image capture camera 20. Additionally, the checking unit 98 outputs an operation state to the operation-state notification unit 102. The checking unit 98 outputs, for example, the state of performing checking or the state of having finished checking.

The checking-result notification unit 100 notifies the UI device 78 and the image forming apparatus 4 of the checking result output from the checking unit 98. Note that, in the present exemplary embodiment, the checking-result accepting unit 54 of the image forming apparatus 4 accepts a checking result of which the checking-result notification unit 100 has notified the UI device 78 and the image forming apparatus 4.

The operation-state notification unit 102 notifies the image forming apparatus 4 of the operation state output from the checking unit 98. Note that, in the present exemplary embodiment, the state-notification accepting unit 50 of the image forming apparatus 4 accepts the operation state of which the operation-state notification unit 102 has notified the image forming apparatus 4.

Next, the operation of the image checking apparatus 6 will be described.

Figure 6:
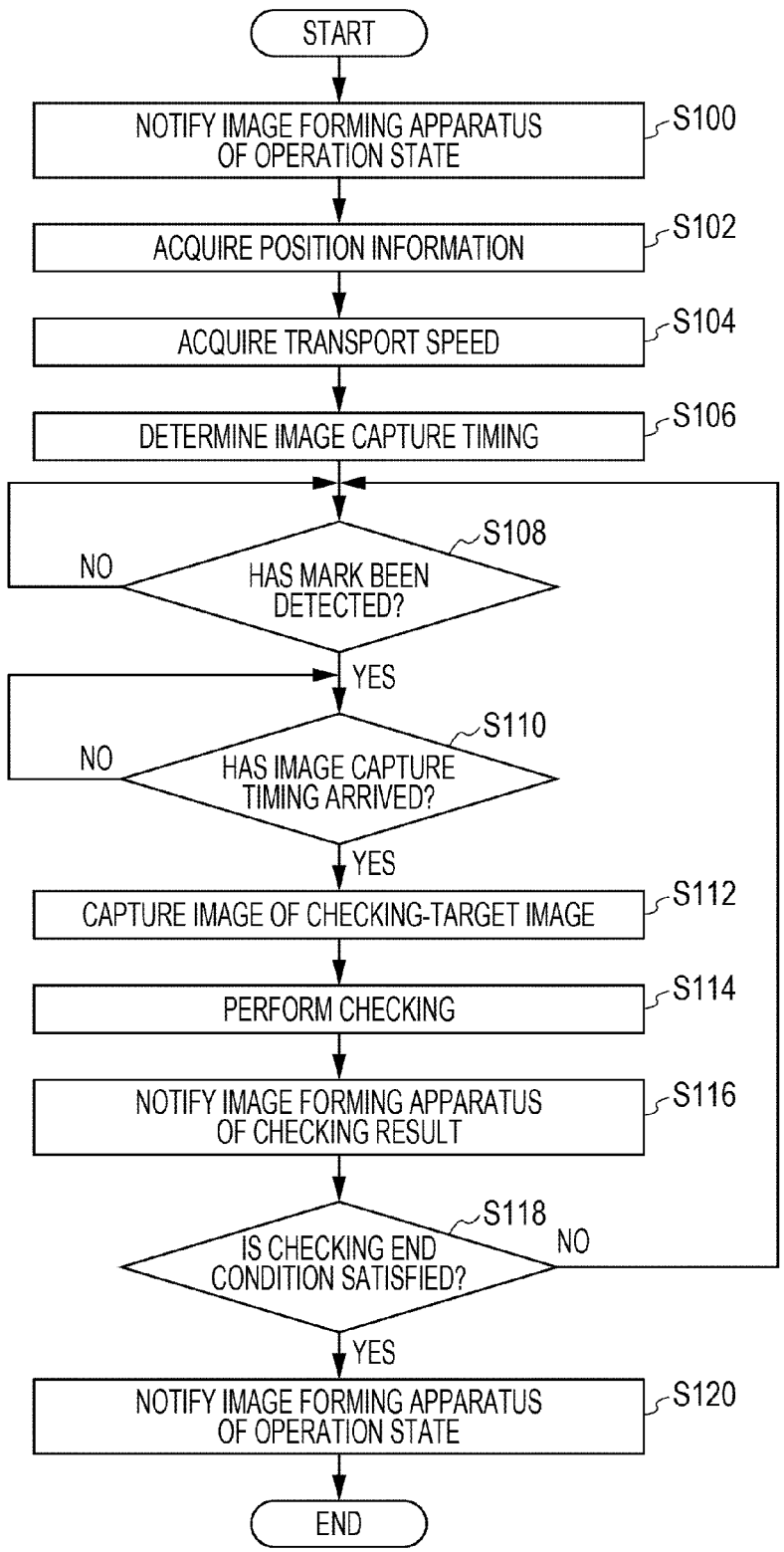
FIG. 6 is a flowchart illustrating an example of an operation of the image checking apparatus.

FIG. 6 is a flowchart illustrating an example of the operation of the image checking apparatus 6.

In step S100, the operation-state notification unit 102 notifies the image forming apparatus 4 that the image checking apparatus 6 is in the state of performing checking. Note that, in the image forming apparatus 4, when this notification has been received, the setting of the print position of the checking-target image and the transport speed are prohibited from being changed.

In step S102, the position-information acquisition unit 90 receives and acquires the position information from the image forming apparatus 4.

In step S104, the transport-speed acquisition unit 92 receives and acquires the transport-speed information from the image forming apparatus 4.

In step S106, the reading controller 96 determines the image capture timing on the basis of the position information and the transport speed, which have been acquired in steps S102 and S104, respectively.

In step S108, the process waits until the detector 94 detects the mark shown on the continuous paper 22 (NO in step S108). When the detector 94 has detected the mark (YES in S108), the process proceeds to step S110.

In step S110, the reading controller 96 waits until a time period that has elapsed since the time at which the detector 94 detected the mark in S108 reaches the image capture timing determined in step S106 (NO in step S110). When the time period has reached the image capture timing (YES in step S110), the process proceeds to step S112.

In step S112, the reading controller 96 performs control so that image capture will be performed for the continuous paper 22 by the image capture camera 20. Accordingly, an image of the checking-target image is captured by the image capture camera 20.

In step S114, the checking unit 98 performs predetermined checking on the basis of the checking-target image whose image has been captured by the image capture camera 20.

In step S116, the checking-result notification unit 100 notifies the image forming apparatus 4 of a checking result. Note that, in the case where the image forming apparatus 4 has been notified of a checking result that indicates abnormality, the image forming apparatus 4 performs control so as to stop the process performed in the image forming apparatus 4. Note that, notification of a checking result may be notification of only a checking result indicating abnormality.

In step S118, the checking unit 98 determines whether or not a predetermined checking end condition is satisfied. When the checking end condition is satisfied, the process proceeds to step S120. When the checking end condition is not satisfied, the process returns to step S108, and checking of subsequent pages is continuously performed. For example, in the case where checking of pages up to the last page that have been printed by the image forming apparatus 4 has been completed or in the case where an instruction to finish checking has been received via the UI device 78, it is determined that the checking end condition is satisfied, and the process proceeds to step S120.

In step S120, the operation-state notification unit 102 notifies the image forming apparatus 4 that the image checking apparatus 6 is in the state of having finished checking. Note that, in the image forming apparatus 4, when this notification has been received, the prohibition of changing the transport speed is cancelled, and, for example, transport of the continuous paper 22 is stopped. Accordingly, for example, until a page which is a page of the continuous paper 22 and which is the last page that has been printed passes the image capture camera 20, the transport speed is maintained.

Note that, with reference to the flowchart illustrated in FIG. 6, an example has been described, in which the position information and the transport speed have been acquired in steps S102 and S104, respectively, and in which image capture is repeated at the image capture timing determined in step S106. However, the image capture timing may be changed while checking is being performed.

For example, information for estimating an amount of transport speed change of the continuous paper 22 in the image forming apparatus 4 is held in a table in advance. When the transport speed has changed, the image capture timing may be determined again on the basis of the estimated amount of transport speed change while checking is being performed, and image capture may be performed at the image capture timing that has been determined again. The estimated amount of transport speed change may be held in the table.

Moreover, the position information and the transport speed may also be acquired in step S108 or any step thereafter. In this case, the reading controller 96 may determine new timing as the image capture timing on the basis of the position information and the transport speed that have been newly acquired, and may perform control so that image capture will be performed at the new image capture timing.

Furthermore, although a configuration in which the control device 14 is provided separately from the printing device 12 is used in the description given above, the control device 14 may be built into, for example, the printing device 12.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
an image forming apparatus that includes a transport control unit which transports a recording medium at a set transport speed, and that forms an image on the recording medium; and
an image checking apparatus that includes
a transport-speed acquisition unit that acquires transport-speed information concerning a transport speed from the image forming apparatus, the transport-speed information being used as control information of the image forming apparatus,
a detector that detects a mark shown on the recording medium which is being transported,
a reading unit that reads a checking-target image on the basis of the transport-speed information and information concerning a positional relationship between the mark and the checking-target image, the checking-target image being formed by the image forming apparatus at a position distant from the mark detected by the detector, and an operation-state notification unit that notifies the image forming apparatus of an operation state of the image checking apparatus, wherein, in a case where the image forming apparatus has received, from the operation-state notification unit, a notification indicating that the image checking apparatus is in a state of performing checking, the image forming apparatus prohibits the set transport speed from being changed, and wherein, in a case where the image forming apparatus has received, from the operation-state notification unit, a notification indicating that the image checking apparatus is in a state of having finished checking, the image forming apparatus cancels the prohibition of changing the set transport speed and stops transport of the recording medium.

2. The image forming system according to claim 1, wherein, in the image checking apparatus, no measurement device that measures the transport speed of the recording medium is provided.

3. The image forming system according to claim 2, wherein, in the case where the image forming apparatus has received, from the operation-state notification unit, the notification indicating that the image checking apparatus is in the state of performing checking, the image forming apparatus further performs control so as to maintain the positional relationship.

4. The image forming system according to claim 3,
wherein the image checking apparatus further includes a position-information acquisition unit that acquires, from the image forming apparatus, the information concerning the positional relationship, and
wherein the reading unit reads the checking-target image on the basis of the transport-speed information, which has been acquired by the transport-speed acquisition unit, and the information concerning the positional relationship, which has been acquired by the position-information acquisition unit.

5. The image forming system according to claim 4, wherein the image checking apparatus further includes a checking-result notification unit that notifies the image forming apparatus of a result of checking based on the checking-target image read by the reading unit.

6. The image forming system according to claim 3, wherein the image checking apparatus further includes a checking-result notification unit that notifies the image forming apparatus of a result of checking based on the checking-target image read by the reading unit.

7. The image forming system according to claim 2,
wherein the image checking apparatus further includes a position-information acquisition unit that acquires, from the image forming apparatus, the information concerning the positional relationship, and
wherein the reading unit reads the checking-target image on the basis of the transport-speed information, which has been acquired by the transport-speed acquisition unit, and the information concerning the positional relationship, which has been acquired by the position-information acquisition unit.

8. The image forming system according to claim 7, wherein the image checking apparatus further includes a checking-result notification unit that notifies the image forming apparatus of a result of checking based on the checking-target image read by the reading unit.

9. The image forming system according to claim 2, wherein the image checking apparatus further includes a checking-result notification unit that notifies the image forming apparatus of a result of checking based on the checking-target image read by the reading unit.

10. The image forming system according to claim 1, wherein, in the case where the image forming apparatus has received, from the operation-state notification unit, the notification indicating that the image checking apparatus is in the state of performing checking, the image forming apparatus further performs control so as to maintain the positional relationship.

11. The image forming system according to claim 10,
wherein the image checking apparatus further includes a position-information acquisition unit that acquires, from the image forming apparatus, the information concerning the positional relationship, and
wherein the reading unit reads the checking-target image on the basis of the transport-speed information, which has been acquired by the transport-speed acquisition unit, and the information concerning the positional relationship, which has been acquired by the position-information acquisition unit.

12. The image forming system according to claim 11, wherein the image checking apparatus further includes a checking-result notification unit that notifies the image forming apparatus of a result of checking based on the checking-target image read by the reading unit.

13. The image forming system according to claim 10, wherein the image checking apparatus further includes a checking-result notification unit that notifies the image forming apparatus of a result of checking based on the checking-target image read by the reading unit.

14. The image forming system according to claim 1,
wherein the image checking apparatus further includes a position-information acquisition unit that acquires, from the image forming apparatus, the information concerning the positional relationship, and
wherein the reading unit reads the checking-target image on the basis of the transport-speed information, which has been acquired by the transport-speed acquisition unit, and the information concerning the positional relationship, which has been acquired by the position-information acquisition unit.

15. The image forming system according to claim 14, wherein the image checking apparatus further includes a checking-result notification unit that notifies the image forming apparatus of a result of checking based on the checking-target image read by the reading unit.

16. The image forming system according to claim 1, wherein the image checking apparatus further includes a checking-result notification unit that notifies the image forming apparatus of a result of checking based on the checking-target image read by the reading unit.

17. The image forming system according to claim 1,
wherein the recording medium is continuous paper,
wherein the detector detects the mark shown on each of pages of the continuous paper, and
wherein the reading unit reads the checking-target image that has been formed by the image forming apparatus on each of the pages of the continuous paper.

18. A non-transitory computer readable medium storing a program causing, in an image forming system which includes an image forming apparatus that forms an image on a recording medium and an image checking apparatus and in which each of the image forming apparatus and the image checking apparatus includes a computer, the computer of the image forming apparatus and the computer of the image checking apparatus to execute a process, the process comprising:

causing the computer of the image forming apparatus to transport a recording medium at a set transport speed;

causing the computer of the image checking apparatus to acquire transport-speed information concerning a transport speed from the image forming apparatus, the transport-speed information being used as control information of the image forming apparatus;

causing the computer of the image checking apparatus to detect a mark shown on the recording medium which is being transported;

causing the computer of the image checking apparatus to read a checking-target image on the basis of the acquired transport-speed information and information concerning a positional relationship between the mark and the checking-target image, the checking-target image being formed by the image forming apparatus at a position distant from the detected mark; and causing the computer of the image checking apparatus to notify the image forming apparatus of an operation state of the image checking apparatus, wherein the process further comprises causing the computer of the image forming apparatus to, in a case where the image forming apparatus has received a notification indicating that the image checking apparatus is in a state of performing checking, prohibit the set transport speed from being changed, and, in a case where the image forming apparatus has received a notification indicating that the image checking apparatus is in a state of having finished checking, cancel the prohibition of changing the set transport speed and stop transport of the recording medium.

* * * * *